(12) United States Patent
Ifju et al.

(10) Patent No.: US 12,623,762 B2
(45) Date of Patent: May 12, 2026

(54) BATHY-DRONE: AN AUTONOMOUS UNMANNED DRONE-TETHERED SONAR SYSTEM

(71) Applicant: University of Florida Research Foundation, Inc., Gainesville, FL (US)

(72) Inventors: Peter G. Ifju, Gainesville, FL (US); Andrew Everette Ortega, Gainesville, FL (US); Henry Tingle, Gainesville, FL (US); Antonio Diaz, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 289 days.

(21) Appl. No.: 18/383,215

(22) Filed: Oct. 24, 2023

(65) Prior Publication Data

US 2024/0294278 A1 Sep. 5, 2024

Related U.S. Application Data

(60) Provisional application No. 63/418,748, filed on Oct. 24, 2022.

(51) Int. Cl.
| | |
|---|---|
| *B63H 7/02* | (2006.01) |
| *B63B 35/00* | (2020.01) |
| *B63B 39/06* | (2006.01) |
| *B63B 79/15* | (2020.01) |
| *B64D 3/00* | (2006.01) |

(Continued)

(52) U.S. Cl.
CPC ............... *B63H 7/02* (2013.01); *B63B 35/00* (2013.01); *B63B 39/061* (2013.01); *B63B*

*79/15* (2020.01); *B64D 3/00* (2013.01); *B63B 2035/006* (2013.01); *B63B 2211/02* (2013.01);

(Continued)

(58) Field of Classification Search
CPC ............... B63H 7/00; B63H 7/02; B63H 9/00
See application file for complete search history.

(56) References Cited

U.S. PATENT DOCUMENTS

| | | | | |
|---|---|---|---|---|
| 3,159,806 A | * | 12/1964 | Piasecki | ................. G01S 15/04 |
| | | | | 367/901 |
| 3,469,229 A | * | 9/1969 | Pure | ......................... G01S 1/02 |
| | | | | 367/902 |

(Continued)

FOREIGN PATENT DOCUMENTS

| | | | | | |
|---|---|---|---|---|---|
| DE | 19730092 A1 | * | 1/1999 | ............... | B63G 8/00 |
| FR | 2803272 A1 | * | 7/2001 | ............... | B64B 1/22 |

(Continued)

*Primary Examiner* — Joseph W Sanderson

(74) *Attorney, Agent, or Firm* — Thomas | Horstemeyer, LLP

(57) ABSTRACT

Various examples are provided related to autonomous unmanned drone-tethered sonar systems. In one embodiment, a bathy-drone system includes an unmanned payload vessel and an unmanned drone tethered to the payload vessel through the tether attachment point. The unmanned payload vessel can include a sensor or sensor suite coupled to a bottom of the payload vessel and a tether attachment point through which propulsive force can be applied to the payload vessel. The drone can autonomously transport the payload vessel to and from a survey location and autonomously propel the payload vessel along a survey path at the survey location.

16 Claims, 9 Drawing Sheets

Any drone capable of carrying, e.g., 15 lb

Vessel
• GPS unit, Antenna
• Communication with ground station
• Data logging
• Multiple cameras
• Sonar unit
• IMU

Drone Tether of any length

(51) Int. Cl.
  *B64U 101/32* (2023.01)
  *B64U 101/35* (2023.01)
  *B64U 101/60* (2023.01)

(52) U.S. Cl.
  CPC ...... *B64U 2101/32* (2023.01); *B64U 2101/35* (2023.01); *B64U 2101/60* (2023.01)

(56) References Cited

U.S. PATENT DOCUMENTS

| | | | | |
|---|---|---|---|---|
| 4,757,481 | A * | 7/1988 | Orr | G01S 7/003 |
| | | | | 367/95 |
| 5,231,609 | A * | 7/1993 | Gaer | G01S 15/872 |
| | | | | 367/136 |
| 6,199,793 | B1 * | 3/2001 | Hainsworth | B63B 21/66 |
| | | | | 244/137.4 |
| 6,213,021 | B1 * | 4/2001 | Pickett | B63G 7/06 |
| | | | | 102/401 |
| 6,260,500 | B1 * | 7/2001 | Coakley | B63B 35/665 |
| | | | | 114/242 |
| 7,263,939 | B1 * | 9/2007 | Phillips | B63H 9/072 |
| | | | | 114/102.16 |
| 7,921,793 | B2 * | 4/2011 | Bruland | B63B 35/66 |
| | | | | 114/345 |
| 9,233,740 | B2 * | 1/2016 | Morvillo | B63B 39/061 |
| 9,248,910 | B1 * | 2/2016 | Vander Lind | C02F 1/4693 |
| 9,353,033 | B2 * | 5/2016 | Vander Lind | F03D 9/008 |
| 10,988,250 | B2 * | 4/2021 | Henry | B63B 32/10 |
| 10,988,252 | B2 * | 4/2021 | Henry | B64U 30/20 |
| 11,987,351 | B2 * | 5/2024 | Peters | B64C 29/0091 |
| 12,116,150 | B2 * | 10/2024 | Estrada | A01K 99/00 |
| 12,426,581 | B2 * | 9/2025 | Hystad | A01K 73/04 |
| 2008/0190345 | A1 * | 8/2008 | Bruland | B63B 35/665 |
| | | | | 114/253 |
| 2009/0071387 | A1 * | 3/2009 | Isikman | B63G 8/001 |
| | | | | 114/39.29 |
| 2014/0224166 | A1 * | 8/2014 | Morvillo | B63B 39/061 |
| | | | | 114/285 |
| 2015/0298806 | A1 * | 10/2015 | Vander Lind | F03D 80/80 |
| | | | | 290/55 |
| 2017/0205820 | A1 * | 7/2017 | Liu | G05D 1/0202 |
| 2018/0346114 | A1 * | 12/2018 | Henry | B64C 39/026 |
| 2018/0346115 | A1 * | 12/2018 | Henry | B63B 32/10 |
| 2018/0346119 | A1 * | 12/2018 | Henry | B63B 32/40 |
| 2019/0039730 | A1 * | 2/2019 | Smoor | B64U 10/14 |
| 2019/0344770 | A1 * | 11/2019 | Cha | B60V 3/025 |
| 2021/0179237 | A1 * | 6/2021 | Fernandez | B63B 32/00 |
| 2022/0097804 | A1 * | 3/2022 | Shariffiasl | B63B 21/54 |
| 2022/0264855 | A1 * | 8/2022 | Hystad | A01K 73/04 |
| 2022/0389904 | A1 * | 12/2022 | Reiners | F03D 5/06 |
| 2023/0192328 | A1 * | 6/2023 | Estrada | A01K 91/02 |
| | | | | 244/110 C |
| 2024/0051661 | A1 * | 2/2024 | Peters | B64C 29/0091 |
| 2024/0158059 | A1 * | 5/2024 | Kettle | B63G 8/42 |
| 2024/0400236 | A1 * | 12/2024 | Talke | B64U 70/93 |

FOREIGN PATENT DOCUMENTS

| | | | | | |
|---|---|---|---|---|---|
| FR | | 2993238 | A1 * | 1/2014 | B63H 9/069 |
| GB | | 2262718 | A * | 6/1993 | B63B 39/06 |
| KR | | 20220099050 | A * | 7/2022 | B64C 39/024 |
| KR | | 20240166724 | A * | 11/2024 | H02S 40/32 |
| WO | WO-2015012762 | A1 * | 1/2015 | | B63B 34/00 |
| WO | WO-2022239580 | A1 * | 11/2022 | | B63B 21/04 |

* cited by examiner

The distributed loads on the hull are not shown

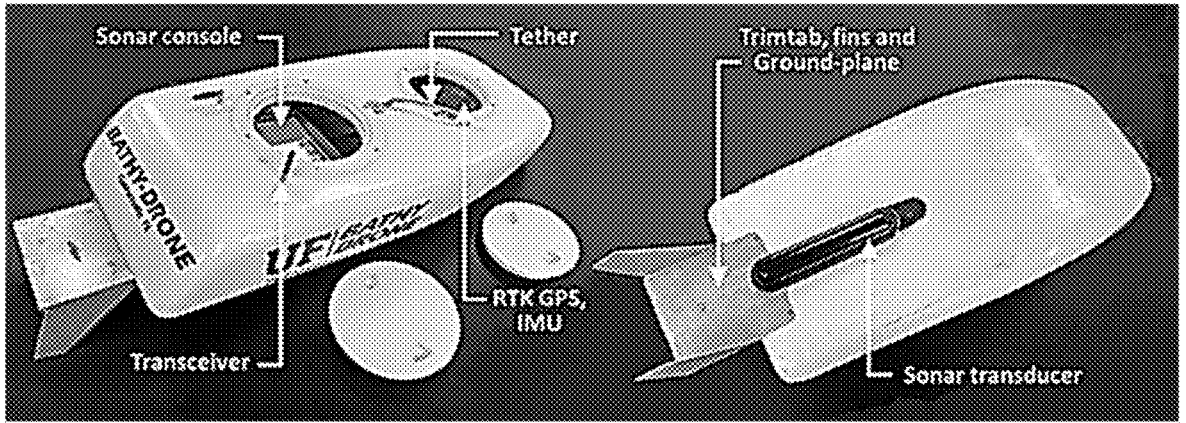
FIG. 3A
FIG. 3B
FIG. 3C

BATHY-DRONE: AN AUTONOMOUS UNMANNED DRONE-TETHERED SONAR SYSTEM

CROSS REFERENCE TO RELATED APPLICATIONS

This application claims priority to, and the benefit of, U.S. provisional application entitled "Bathy-Drone: An Autonomous Unmanned Drone-Tethered Sonar System" having Ser. No. 63/418,748, filed Oct. 24, 2022, which is hereby incorporated by reference in its entirety.

BACKGROUND

There is a wide variety of methods employed to perform bathymetry for an innumerable variety of scales and applications. Satellites can provide large scale surveys of large bodies of water, such as lakes, bays, gulfs, and oceans, while drones and small unmanned watercraft are increasingly used for smaller waterbodies such as rivers, inlets, retention ponds, boat basins, shipping channels, and nearshore applications. The benefit of increased field operator safety, reduced fatigue and environmental exposure, and more accurate raster patterns are primary motivations behind unmanned systems.

SUMMARY

Aspects of the present disclosure are related to autonomous unmanned drone-tethered sonar systems and methods thereof. In one aspect, among others, a bathy-drone system comprises an unmanned payload vessel comprising a sensor or sensor suite coupled to a bottom of the payload vessel and a tether attachment point through which propulsive force is applied to the payload vessel; and an unmanned drone tethered to the payload vessel through the tether attachment point, the drone capable of autonomously transporting the payload vessel to and from a survey location and autonomously propelling the payload vessel along a survey path at the survey location. In one or more aspects, a force exerted on the payload vessel by the drone through the tether attachment point can pass through a center of gravity of the payload vessel. The payload vessel can be unmanned aircraft system (UAS) agnostic allowing any unmanned drone to tow the payload vessel without prior modification.

In various aspects, the payload vessel can have a weight, and the unmanned drone can carry the weight of the payload vessel. The payload vessel cab comprise a trim plate extending from a stern of the payload vessel. The trim plate can be angled downward aft of the stern thereby providing a speed-dependent pitching moment that maintains the payload vessel level as it is propelled by the drone. The trim plate can be configured to maintain the payload vessel level in a speed range from zero to about 24 km/h. The trim plate can be weighted to maintain the payload vessel level at standstill. The trim plate can comprise fins extending below the trim plate. The payload vessel can pivot about the fins. The trim plate can act as an electrical ground for the sensor or sensor suite. The payload vessel can comprise a skiff-like hull design.

In some aspects, the payload vessel can be configured to transmit data collected by the sensor or sensor suite via on board telemetry link. The collected data can comprise one or more of water temperature, turbidity, salinity, dissolved oxygen, nitrogen, depth, position, heading, or imagery. The payload vessel can be configured to communicatively couple to the drone, and the collected data can be transmitted to the base station via the telemetry link. The Bathy-drone system can comprise an autopilot configured to independently steer the payload vessel by a rudder. The sensor or sensor suite can be affixed to the bottom of the payload vessel. The sensor or sensor suite can comprise a sonar transducer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3C are images of the payload vessel of the bathy-drone system, in accordance with various embodiments of the present disclosure.

DETAILED DESCRIPTION

Figure 1A:
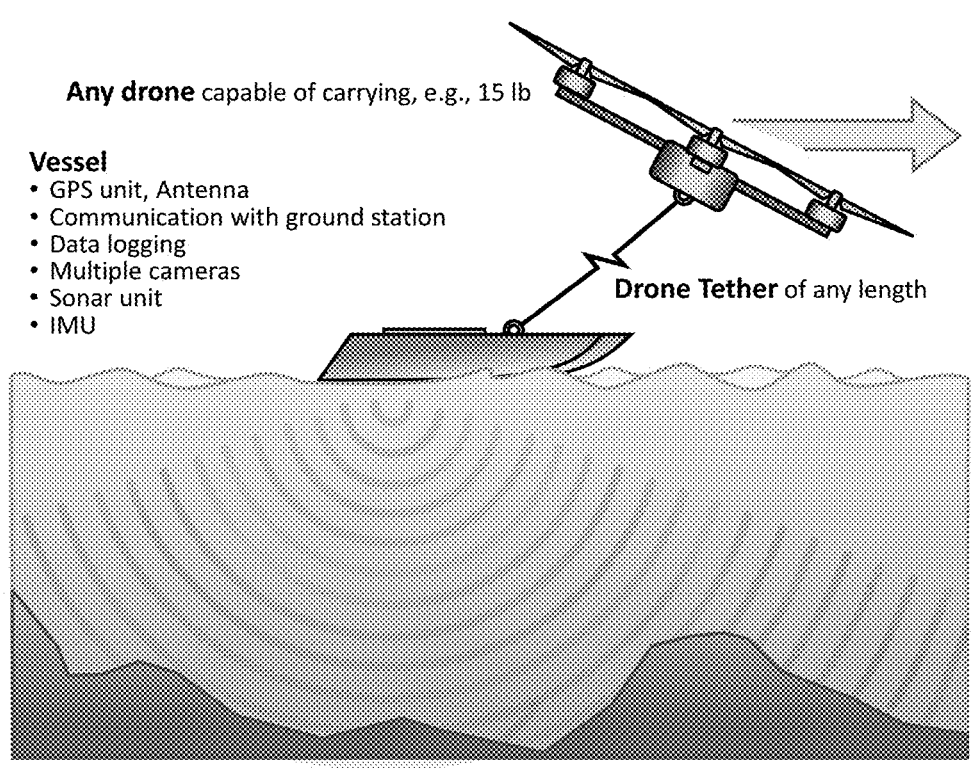
FIGS. 1A and 1B illustrate an example of a bathy-drone system, in accordance with various embodiments of the present disclosure.

Disclosed herein are various examples related to autonomous unmanned drone-tethered sonar systems and methods thereof. A unique drone-based method is introduced to perform bathymetry on relatively small waterways with high spatial and temporal resolution. Reference will now be made in detail to the description of the embodiments as illustrated in the drawings, wherein like reference numbers indicate like parts throughout the several views.

The literature on drone-based and unmanned watercraft-based bathymetry shows that a variety of sensors have been utilized, each having their advantages and limitations. They can be grouped into airborne methods, such as photogrammetry, lidar, radar, and fluid lensing, and immersed methods such as sonar and underwater photogrammetry. Unmanned surface vehicles (USV) and unmanned underwater vehicles (UUV) allow for sensors, such as acoustic sensors, since these vehicles are in contact with the water, while aerial drones can only utilize sensors that operate with a stand-off from the water surface. Typically, USVs and UUVs are slower moving with a smaller sensor swath than aerial drones and thus limit the area covered during operation. Typical sensors, platforms, and applications associated with small, unmanned aircraft and unmanned watercraft, providing the motivation and background for the development of the Bathy-drone are reviewed.

Remote sensing instruments used for unmanned bathymetry are grouped into optical or acoustic sensing which can each be accomplished with passive or active methods. Optical sensors can actively measure reflected energy, such as with immersed range-gated camera systems or water penetrating green lidar, which can reach depths of 40-50 m in clear waters. Passively sensing reflected, or scattered, light is accomplished with hyper- or multi-spectral imaging, or strictly in the visible light spectrum and the imagery may be georeferenced with Structure from Motion (SfM) and photogrammetry.

Acoustic sensors typically rely on active sensing by emitting acoustic waves and measuring the reflected, scattered, and absorbed energy. Acoustic methods used in unmanned bathymetry include sonar technologies such as multibeam and single beam echo sounders (MBES or SBES respectively), side-scan sonars (SSS), and phase measuring side-scan sonar (PMSS). Water penetrating radar (WPR) and Doppler velocity logger (DVL) or acoustic Doppler current profilers (ADCP) are also active acoustic sensors that have been used in unmanned bathymetry. In the oil and gas industry, seismographic or sub-bottom profiler (SBP) sensing, either active or passive, is also a popular method of mapping.

Ancillary sensors are used with both optical and acoustic techniques and typically correct for positioning, heading, attitude, tide, and sound velocity. Respectively, these corrections can be accomplished with GNSS antenna, gyrocompass, IMU or INS, marigraph, and sound velocity profiler.

The desired data characteristics depend on the application, and unmanned solutions are still developing. For example, deep-sea exploration can involve manned expeditions focused on extensive coverage to capture geological features within a resolution of 50 meters. Navigable coastal and inland waterways, which typically are shallow waters, have been surveyed by multiple unmanned bathymetric platforms to meet the rigorous navigational mapping safety standards set by agencies such as the International Hydrographic Organization (IHO) or the US Army Corps of Engineers which can dictate a resolution to detect features of 0.5 m and accuracy of below 1 m uncertainty depending on under-keel clearance. Categorizing habitats and infrastructure is another application of unmanned bathymetric platforms and demands understanding the bottom composition of the observed area. Under any of a variety of scenarios, the specific application needs guide the selection of appropriate platforms and sensors.

Bathymetry systems can be categorized as sensing-immersed such as USV and UUV or above-the-water such as satellites and unmanned aircraft systems (UAS). Satellite altimetry provides entire models of the Earth based on radar readings of water height and slope, induced by local gravity of subsea geological features, and is independent of water clarity with spatial resolution varying between 1-12 km. Satellites such as the Hyperion hyperspectral sensor onboard NASA's EO-1 platform have collected bathymetry above coastal waters in large swaths of about 7 km to a spatial resolution of 30 meters and 1-20 meters of water depth depending on clarity. The large swath coverage of satellites is excellent for capturing expansive geological features, but the resolution is not useful for safe maritime navigation. Satellites have also used camera sensors for depth estimation methods through wave celerity inversion, leading to sub-meter resolution, in less than 35 m clear water.

Fluid lensing photogrammetry from UAS also uses camera sensors and can result in up to centimeter-scale resolution, as the technique filters for advantageous images with magnifying wave conditions. The trend seen in photogrammetry is also observed with UAS radar altimetry compared to satellite altimetry: a shorter sensor to area of interest distance typically leads to refined accuracy, precision and resolution while sacrificing swath coverage. Lidar bathymetry must strike a balance, and when paired with UAS such as Reigl's bathycopter an observation height of 500-600 m can lead to accuracy of 3-5 cm at depths of 0-4 m in small to medium rivers of width 5-25 m. This tradeoff provides each optical sensor and platform pairing with unique utility, but they are all challenged by obstructions such as grassy bottom composition or flotsam, suspended particles impacting water clarity, water refraction (when not immersed), and overhanging structures such as foliage or cliffs.

Acoustic sensors have been paired with USV, UUV, and UAS to great success in research and from commercial suppliers. USV with SBES, MBES, SSS, PMBS, and ADCP have all led to successful bathymetric surveys. Most acoustic sensors are deployed on UUV or USV and do not need to account for water surface reflection or refraction. Depending on the sensor and frequencies used, acoustic sensors on USV can typically record depths of 0.2 m to thousands of meters regardless of turbidity. Centimeter resolution can be achieved with sonar on USV but varies due to factors such as sensor frequency and depth. There are a variety of USV hull shapes to accommodate different sensors and marine environments, such as small-waterplane-area twin hull (SWATH), catamaran, V-hull, and more. Commercial and research USV such as the Seafloor Systems Hydrone, Jetyak, and Searobotics Hycat have successfully conducted bathymetric surveys for navigational purposes and characterization of the bottom environment in coastal and inland bodies of water. Observations from USV platforms are slower than airborne platforms due to the closer proximity, reducing the swath coverage area of the sensor, and the increased drag on the platform in water compared to air. USV and ROV deployment is also challenging as it typically requires a manned vessel to arrive at the study site or a boat ramp for field operators to lift the vehicle into the water. USV and ROV are also typically electrically self-propelled and can struggle to steer in an autonomous mission safely and accurately against strong currents and winds.

Hybridization of platforms and sensor packages has led to new combinations of sensor fusion and enabled novel deployment opportunities and results. For example, combining aquatic and aerial sensors such as camera photogrammetry and sonar can improve the results of the independent sensors, especially in transitionary areas where one sensor has advantages over the other. A unique and emerging platform hybrid is that of the tethered acoustic sensor to a UAS. Historically, this configuration can be seen on manned helicopters with dipping sonar for submarine detection, and plenty of towable sonar packages exist for manned marine vessels such as for analyzing coral reefs. Most UAS with tethered sonar uses small lightweight SBES with limited ancillary sensors. They typically used bobber-shaped casting sonar from Lowrance which lacks ancillary sensors such as IMU but is excellent for extending the UAS range to take sparse point measurements by minimizing payload weight. The Bathy-drone proposed in this disclosure is a novel approach to unmanned bathymetry, configured as a tethered, hull-enclosed sonar with IMU and RTK-GNSS that can autonomously gather bathymetric data.

As evidenced by the literature, there is a trend to develop efficient unmanned systems that are practical, inexpensive, easy to deploy, and provide high spatial and temporal resolution for bathymetry on small bodies of water, such as ponds, rivers, boat basins, shipping lanes, pre-construction, and nearshore applications. A system has been developed that incorporates a drone that drags a vessel/platform via a tether that can be equipped with a variety of sensors such as sonar or underwater cameras.

Figure 1B:
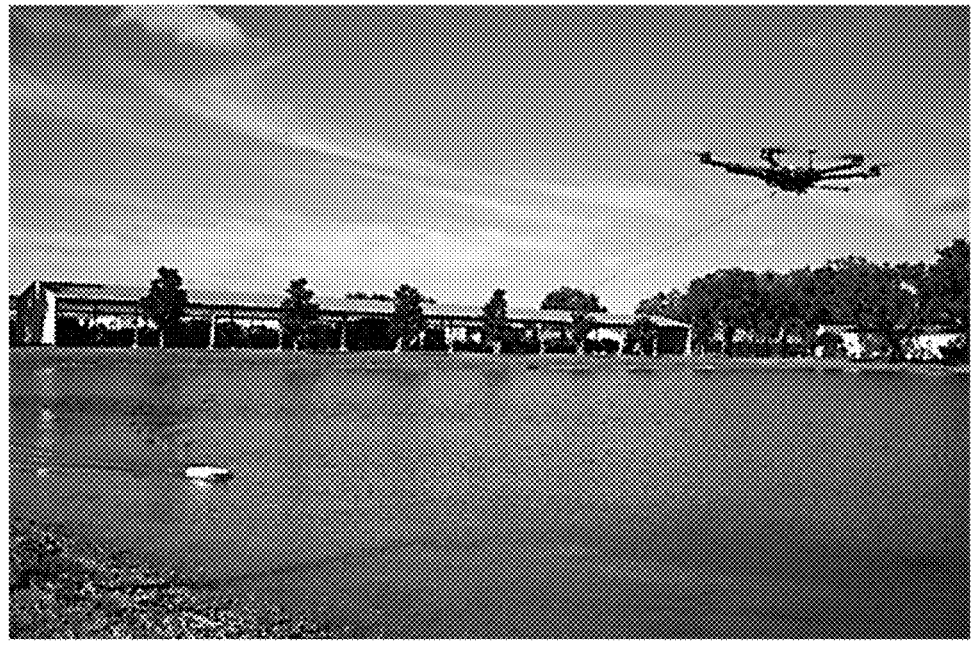

FIGS. 1A and 1B illustrate an example of the Bathy-Drone system. The system comprises a payload vessel, which can be lifted to the water, and then pulled by an unmanned aircraft via a tether. Since the system combines both an aerial drone and an asset on the water surface it has the potential to combine the advantages and characteristics of both an UAS and an USV into one complete system that works together to perform both aerial surveys and underwater surveys. It has advantages over USVs since the system can be flown to the survey location; thus, many surveys can be initiated from a land-based ground station, and no boats or boat ramps are needed if the location is within the FAA required visual line-of-sight.

The two components can be hard-wired together to ensure robust communication. Each can be equipped with a myriad of sensors so that data-set fusion can provide a complete survey of complex near-shore geological features, both above and below the water surface. The drone can be equipped with one or more sensor such as, e.g., RGB cameras, lidar, ground penetrating radar, along with the usual IMU and/or GPS sensors. The vessel portion can incorporate one or more sensor or sensor suite comprising, e.g., sonar, ADCPs, cameras IMU/GPS, as well as sensors to measure water turbidity, temperature, salinity, and harmful contaminants such as algal blooms, and/or K-Brevis. This combination represents the best of both the aerial and water surface assets in one complete system. Since the vessel has no propulsion system (propellers), floating vegetation does not hamper operation.

System Design

The design of the vessel for the Bathy-drone system is configured to allow the system to perform over a wide range of speeds without capsizing in turns while maintaining a level attitude and housing the sonar components. The vessel can be configured track in a straight line behind/below the drone to ensure that the passive vessel path is similar to the commanded drone path. Unlike most powered vessels, the driving force produced by the drone through the tether does not act in a direction parallel to the water surface. Instead, it acts upward at an angle that is determined by the length of the tether and the height of the drone above the water. Thus, the upward component of the force vector needs to be considered in the vessel design.

During the process of designing the hull, three basic shapes were tested, a soft-edge V-hull shape, a trimaran shape, and a skiff-like planing (planes or skims on the water surface verses a hull that parts the water) hull. Each of these were satisfactory for straight line portions of the mission patterns, but the lateral resistance, especially in the bow of the V-hull and trimaran, led to capsizing issues in the turns. This was documented by repeated experiments that were conducted over a wide velocity and corner radius range. The soft-edge skiff-like planing hull shape proved robust in both straight/level tracking, and corner turns once a trim plate and fins were added.

Figure 2A:
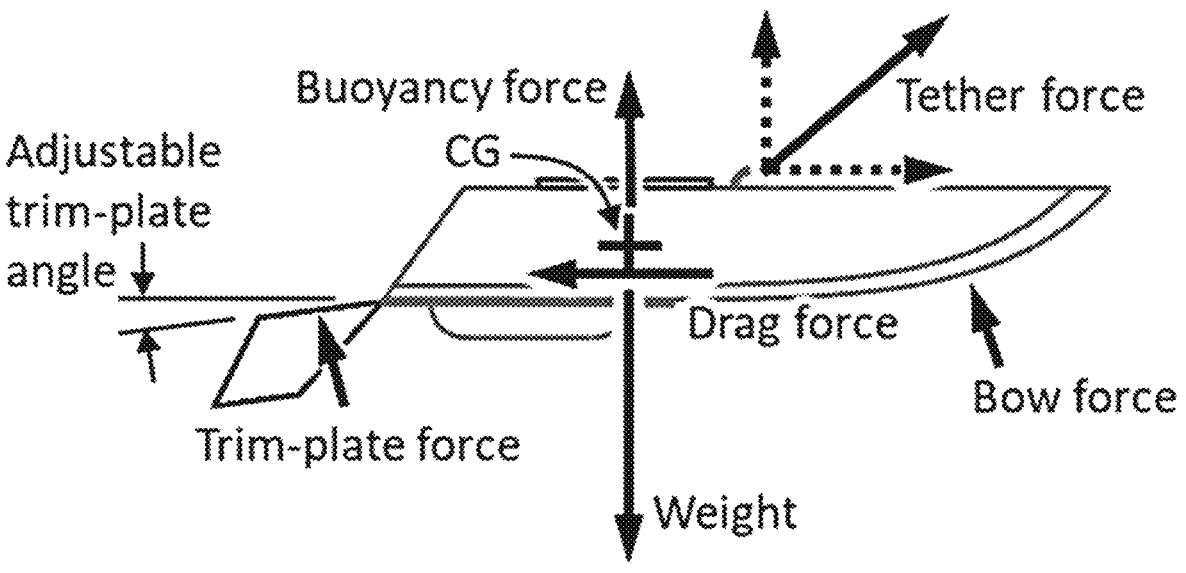
FIGS. 2A and 2B illustrate forces exerted on the hull of a payload vessel of the bathy-drone system, in accordance with various embodiments of the present disclosure.
Figure 2B:
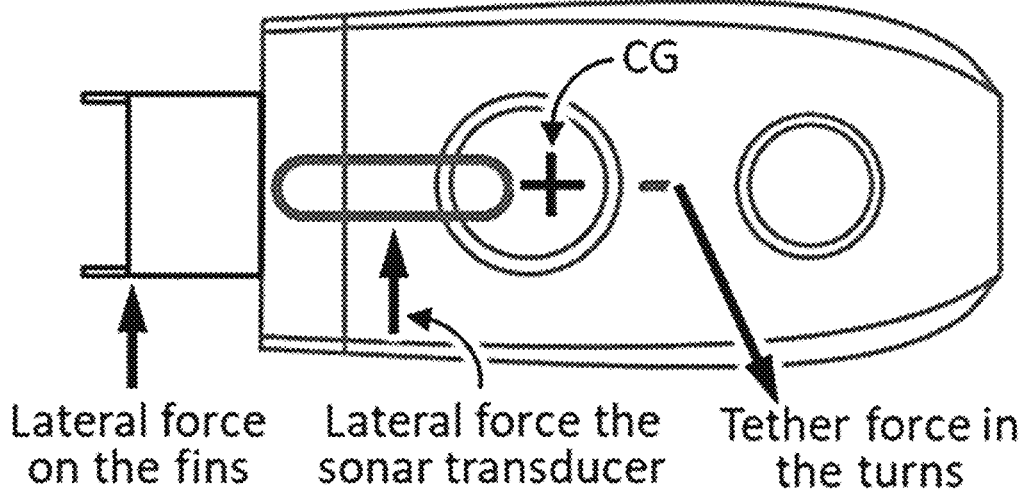

The location of the tether attachment point on the vessel proved to be important to balance the forces on the hull through the entire speed range. The first attempt placed the tether attachment point on the nose of the vessel, but this led to longitudinal pitch-up as a function of speed. After analysis of the free body diagram at a constant velocity, it was determined that attaching the tether so that the force passes through the center of gravity (CG), trim and level conditions were achieved through the entire speed range. FIG. 2A shows the forces acting on the hull at a constant velocity. The tether provides a constant pulling force that is dependent on the drag force, which is horizontal, while the pulling force is angled upward. Both are dependent on the speed of the vessel and/or the drone. Other forces on the hull include an upward buoyancy force and a hydrodynamic force on the forward portion of the rocker line. The latter is speed-dependent and tends to produce a longitudinal pitching moment about the CG that results in the bow pitching upwards as the speed increases. To compensate for this pitching moment, a trim plate (or trim tab) was added behind the CG, angled downward, to produce a speed-dependent pitching moment in the opposite direction of the speed-dependent bow pitching moment. The trim plate is like a horizontal stabilizer on an aircraft. By placing the tether attachment location so that the force acts through the CG, and with the angle of the trim plate (or tab) empirically optimized, the vessel tracked level through the speed range of 0 through 24 km/h. By incorporating two fins on the trim plate (or tab), tracking of the vessel improved as well as allowing turns without capsizing. The fins act as a pivot point where horizontal forces through the tether swing the hull's bow around, as shown in FIG. 2B. In a turn, the tether force acts laterally with respect to the hull. The soft edges of the planing hull bow rocker provide little lateral resistance, and thus the bow swings around smoothly in the turns. This was not the case for the V-hull and trimaran shapes.

Additional considerations in the design included providing adequate volume in the hull to house the sonar console (see the image of FIG. 3C) and ports to provide easy access to the microSD cards, batteries, and console keypad. The CG was also factored into the design so that at 0 km/h, the hull floated level. This was done by balancing the buoyancy force with the center of gravity of the vessel. Small adjustments were made to achieve this by slight shifts to the CG and small weight plates mounted on the top of the trim plate. The aluminum trim-plate also acts as an electrical ground for the sonar transducer, mounted on the bottom in the aft portion of the hull. (See FIG. 3A).

The sonar unit can be a low-cost commercial off-the-shelf (COTS) recreational fish-finder by Lowrance, model Elite ti7, with an active scan transducer. The Lowrance sonar unit includes a NMEA serial data port which allows for communication between other marine electronics. By using this port, the Lowrance can output serial data packets to the ground station using an onboard telemetry link. The telemetry link is a RFD900+ long-range 900 mhz transmitter that can send data up to 30 km in optimal conditions. The NMEA protocol uses a variety of 'sentences' to transmit individual data streams. The Lowrance menu allows for the selection of NMEA sentences and at what frequency they are output. The Bathy-drone currently outputs the GPS position and the sonar depth values using the following packet types; DBT—Depth Below Transducer, DPT—Depth of Water, RMC—Recommended Minimum Navigation Information, GGA—Global Positioning System Fix Data, HDG—Magnetic heading, deviation, variation, GLL—Geographic Position, Latitude/Longitude, and VTG-Track Made Good and Ground Speed. These sentences are broadcast using the RFD900 telemetry link and are received by the ground station computer to interpret the data using the Reefmaster software package. The sonar imagery down and side scan data can be transmitted to the ground station or saved directly to the onboard memory (e.g., microSD card) to conserve telemetry bandwidth. A Pixhawk Cube orange with a here+ RTK system was included in this design (or with RTK+IMU integration). FIG. 3A includes isometric views of the Bathy-drone from the top showing sonar screen through the open 248 hatches (left) and from the bottom with fins and transducer (right). FIG. 3B is an image of a Bathy-drone with the included sonar console shown in FIG. 3C.

The Bathy-drone vessel was designed to be multirotor UAS agnostic as long as the done can carry the weight of the vessel portion. The interface between the UAS and the vessel can be as simple as a knot. Any drone can therefore tow the vessel without any prior modification. The DJI Matrice 600 drone was utilized to test the Bathy-drone vessel and has 30 minutes of battery life and 6 kg payload capacity. An alternate platform, the Alta X drone from Freefly Systems has similar performance metrics. The implemented Bathy-drone weighs just under 14 lbs and is easily airlifted by the Matrice 600 to be shuttled to the water surface.

Basic bathymetry and bottom harness can be performed with a COTS sonar unit that is uncorrected for vessel attitude. RTK GPS and IMU data can be implemented to produce survey grade results. Wave height and period can also be measured with the IMU data and knowledge of the vessel/drone velocity. Drones can be outfitted with cameras and combined with vessel sensors and photogrammetric capabilities on the aerial asset. A rudder can be added to the vessel to track more faithfully behind the drone or to steer wide, much like a water skier, for inspection of infrastructure, keeping the drone from colliding into hard structures. This rudder can also be used, along with a load cell on the tether, to measure river or longshore current. The primary outputs of the sonar sensor can be calibrated to provide full-field bottom hardness data to overlay on top of the bathymetric data. The approach was experimentally validated using collected data on a 5-acre pond made with RTK pole readings at evenly spaced locations.

Experimental Procedures

Traditional methods of pond survey include a field crew operating a small watercraft to measure the pond bottom in a systematic grid pattern. Measurements were taken via a level pole, range pole, or sounding wire and are interpolated to create an estimated surface of the pond bottom.

Figure 4A:
FIGS. 4A and 4B illustrate ground truth data collected from a 5-acre pond for testing of a bathy-drone system, in accordance with various embodiments of the present disclosure.

Testing was conducted at a 1086-acre facility which conducts specialty crop research. The facility allows for testing of unmanned aircraft systems in an unpopulated area. On this property, there is a 5-acre retention pond in which the bathy-drone system was tested. Measurements from a graduated level rod were used to measure the bottom surface of the pond and compare the obtained sonar data to traditional survey methodology. As shown in FIG. 4A, the moving rover and the data collector took topographic points throughout the pond from a barge (left image). A custom 3D printed silt foot was used to prevent the level rod from penetrating the silt bottom. (center image).

To take direct measurements, a Trimble RTK GNSS survey system was attached to the top of a 25 foot adjustable fiberglass level rod. RTK GNSS uses a stationary base station to transmit corrections to a moving rover with a radio or internet data link (right image of FIG. 4A). The base station was set up on a nail driven into the asphalt (left tripod), and the radio (right tripod) transmitted the RTK GNSS corrections. The base nail was measured for 8 hours as static observations and submitted to NOAA OPUS. Topographic points collected across different days were translated so that the base station points align with the NOAA OPUS solution. These computed corrections allow the rover to obtain centimeter-level accuracy point measurements.

Figure 4B:
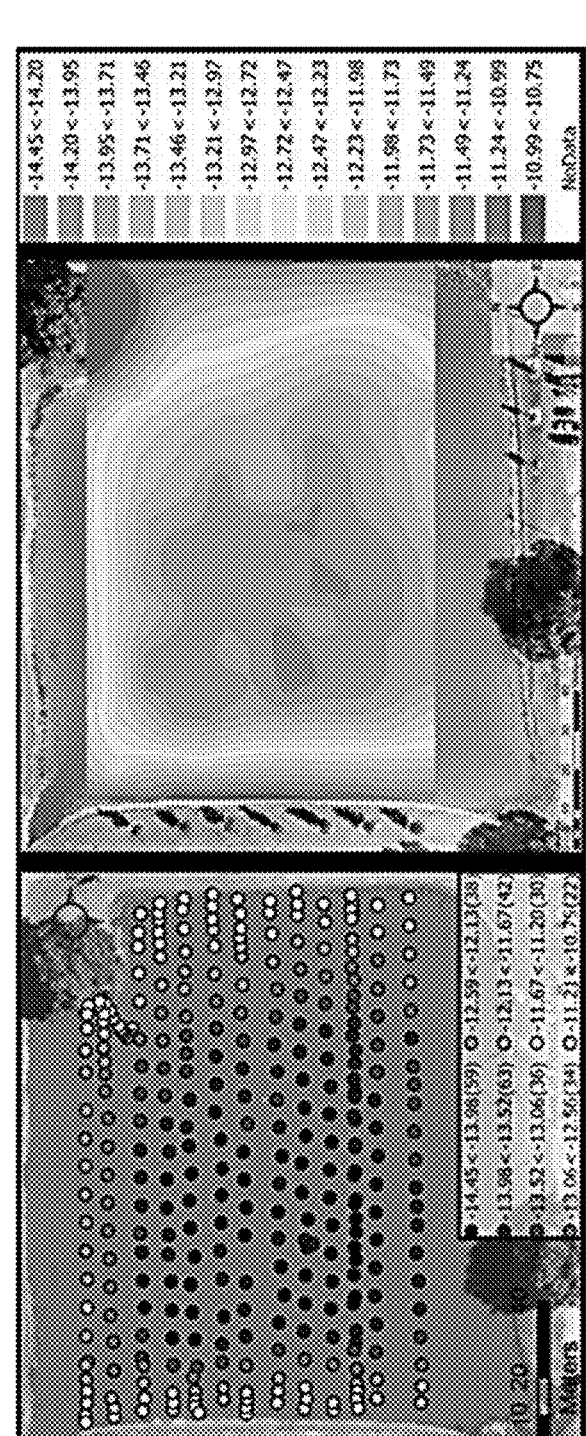

Data from the base station was entered into NOAA OPUS to translate the observations gathered into the national spatial reference system. FIG. 4B shows ground truthing data comprising 324 RTK corrected points with a minimum depth of 286 0.17 m, maximum of 3.87 m, mean of 2.30 m, and standard deviation of 1.03 m (left). Local polynomial interpolation of the ground truth data (right). Horizontal coordinates are in NAD 1983 (2011) State Plane Florida West FIPS 0902 (Meters) and vertical coordinates are in height above ellipsoid (meters).

The ground-truthing experiments used the Trimble SPS855 as the base station receiver and the SPS986 as the rover platform. Corrections were transmitted using a high-power 35-watt TDL450 radio. The level rod and observation barge were tethered to a rope that was strung across the length of the pond (left image of FIG. 4A). The rope was graduated with markings every 7.6 m (25 feet). Each of the points surveyed for the ground-truthing has a report of associated observation notes and statistics such as dilution of precision, number of satellites, horizontal precision (DRMS), vertical precision (1 sigma), and tilt distance. As a summary of the measurement uncertainty associated with the ground-truthing points gathered, the reported tilt distance average was 6 cm with a standard deviation of 5 cm, horizontal precision average was 1 cm with a standard deviation of 1 cm, and the vertical precision average was 2 cm with a standard deviation of 1 cm.

The file containing the waypoints of an autonomous flight mission was created in an external software package such as, e.g., ArcGIS® Pro or Google Earth®. The ground-truthing mission used ArcGIS® Pro point creation tools to create equally spaced waypoints and the line creation tool for the flight lines. The "export to KMZ" geoprocessing tool was then used to create a file compatible with DJI® ground station pro software and with the DJI® Matrice 600 multirotor. Ground Station Pro allows operators to set mission parameters such as speed and elevation and transmits the preplanned mission to the drone. The pilot can see the mission status, as well as battery and GPS signal levels, live throughout the flight mission. The autonomous turn settings can be changed from stop and turn to continuous radius turns. Radius turns prevent capsizing from abrupt slackening and tugging of the towline. The radius can be programmed to be as large as possible between transects which can vary in spacing depending on the resulting resolution desired from the sonar data. Alternatively, autonomous missions can be planned on the open-source software Mission Planner.

Figure 5:
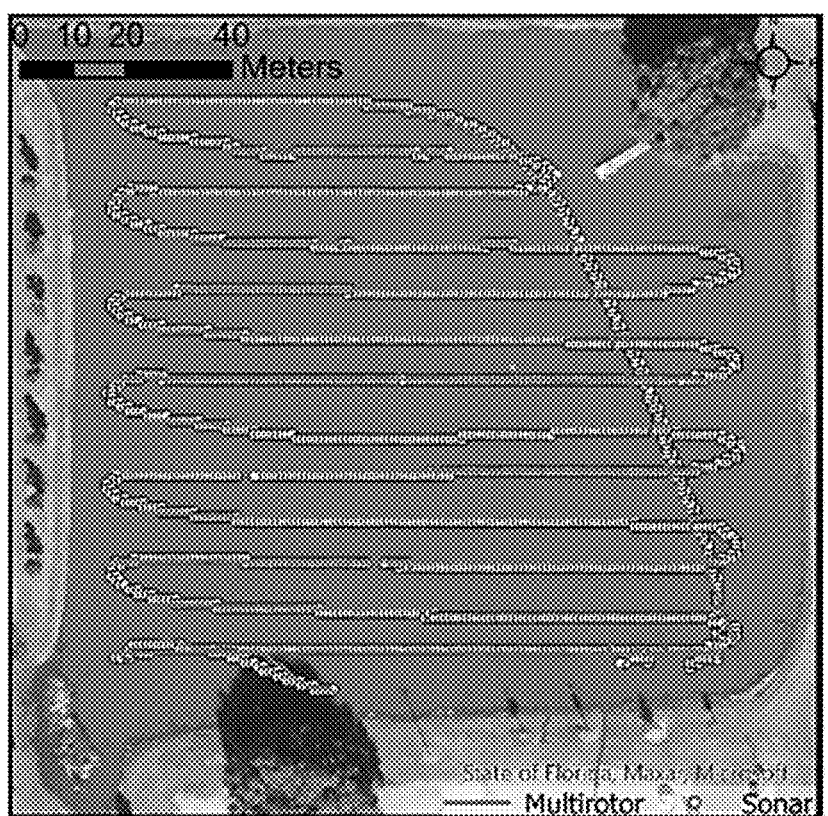
FIG. 5 illustrates an example of recorded paths of a drone and payload vessel of the bathy-drone system, in accordance with various embodiments of the present disclosure.

The current flight field procedures were developed for ground-truthing of the system and gathering data for isobaths that tie to geodetic datums. The vessel electronics are turned on and set to record before takeoff of the UAS. Standard flight operating procedures and safety were followed. The pilot navigates the drone to the first waypoint lifting the vessel above any obstructions. The drone is lowered to the flight altitude of 6 m (20 feet), placing the vessel on the water. With the drone and vessel at the starting waypoint, the autonomous mission is enabled. The autopilot flies the drone and vessel to the recovery point while the pilot maintains the ability to interfere if necessary. A top of water surface reading was taken with RTK GNSS to offset the sonar measurements and translate the measurements to the coordinate system of the geodetic datums. FIG. 5 shows a typical path for both the multirotor drone (solid line showing GNSS recorded flight path of multirotor drone) and the vessel (points showing path of the sonar payload vessel).

ReefMaster is a commercial software package used for the interpretation and analysis of data from recreational fish finders and sonar units. ReefMaster supports data import from Lowrance and Hummingbird brand sonar units and can export generic point data such as shapefiles and CSV files. The combination of USV with fish finder sonar data processed through Reefmaster, has proven results in bathymetry, ecological classification, and bottom characterization in multiple projects.

The software acts as part of the ground station during the flight in the field by receiving data over a telemetry link. Live data visualization on the ground station can be achieved by processing depth and position updates using the NMEA protocol. Live telemetry can support the transmission of depth value data; raw sonar data can be saved to and read from the microSD card. The Bathy-drone sonar package from Lowrance produces a sl2 file format to store the raw data from the 3-in-1 sonar transducer onboard. Reefmaster software can import the sl2 file from the Lowrance microSD between missions for sonar data visualization on the ground station. Rapid on-site isobaths and bottom hardness plots can be created on the ground station running Reefmaster to inform the next mission. Additionally, Reefmaster can export CSV and shapefiles for further processing on Excel, MATLAB, Python, and ArcGIS Pro. The live link can prevent loss of data during malfunctions such as power loss and adds redundancy to the onboard storage. The in-field review can help ensure that the operators met the specified mission before returning to the office.

Results

Figure 6A:
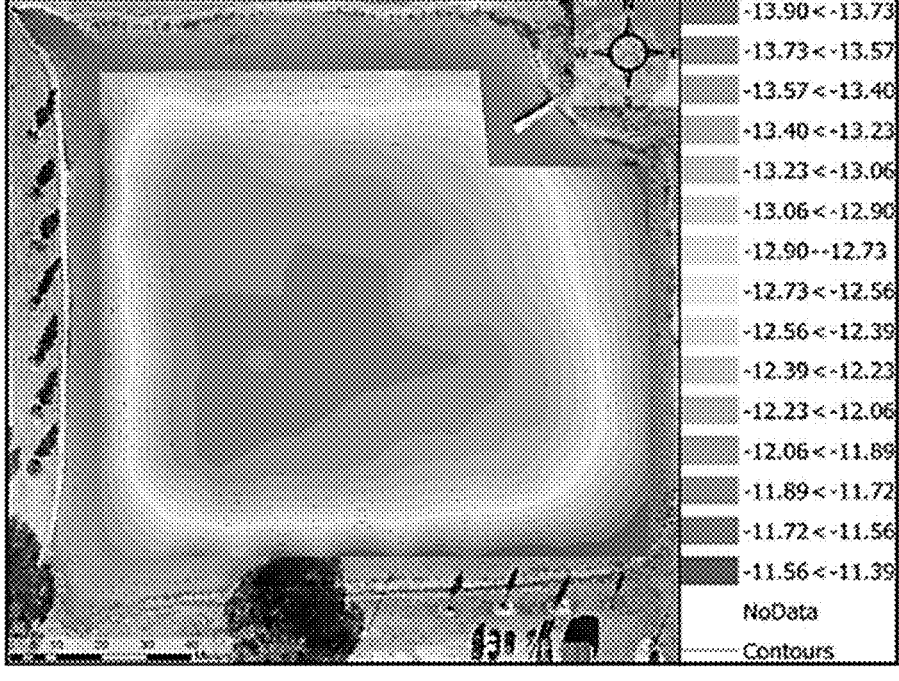
FIGS. 6A-6F and 7A-7D illustrate examples of test results of the bathy-drone system, in accordance with various embodiments of the present disclosure.
Figure 6B:
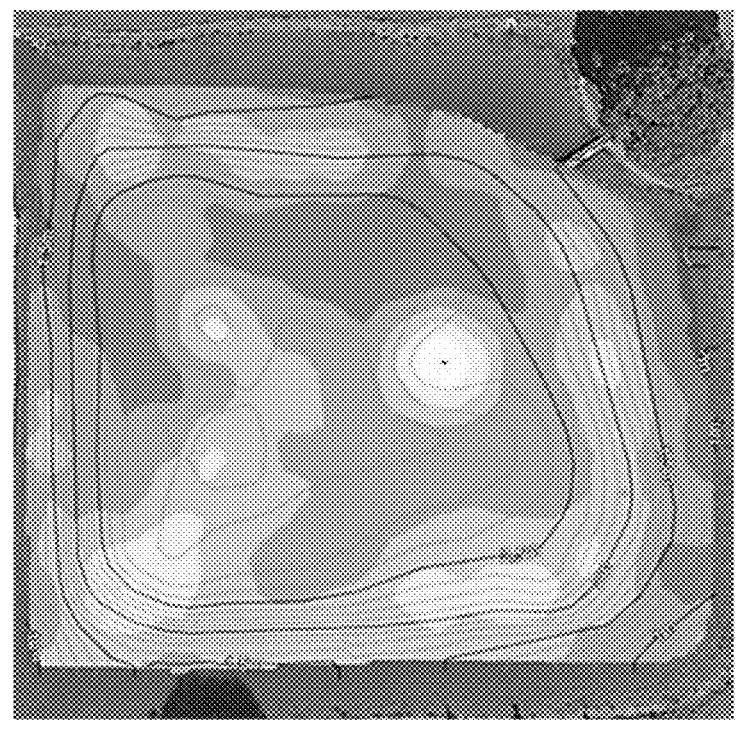
Figure 6D:
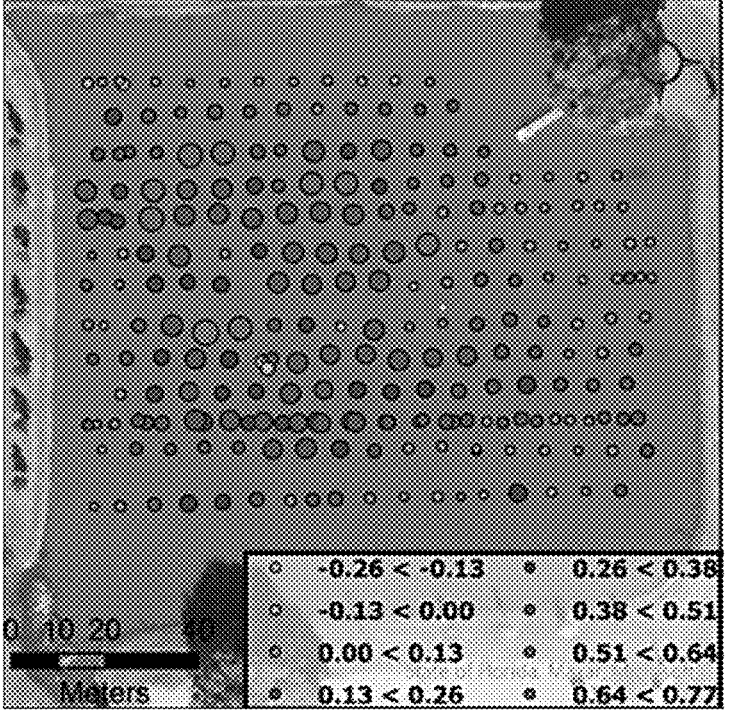
Figure 6C:
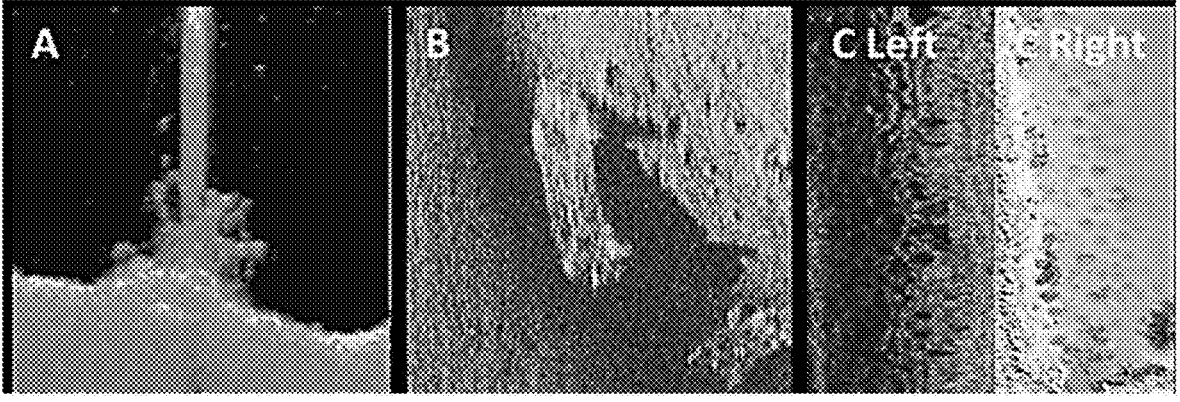

The in-field results generated by preliminary processing of the raw sonar data on Reefmaster with further processing on ArcGIS Pro include isobaths, bottom hardness, and sonar side-scan imagery. FIG. 6A shows the local polynomial interpolation of sonar data from a cross boustrophedon flight pattern at 4.5 mph. FIG. 6B shows bottom hardness as a measure of acoustic backscatter where light areas are softer and darker areas are harder. The bottom hardness plot is overlayed on isobaths. FIG. 6C shows sonar of the C-11 canal located in south Florida. The image details a pile showing accumulated vegetation and scour undermining the pile (image A). This shows the potential to the drone bathymetry system for inspection of civil infrastructure. Also shown are side-scan sonar of submersed vehicle in a quarry (image B) and side of tilapia nesting beds captured in sonar (image C on left) at the Citra Pond compared with photogrammetry (image C on right). The primary outputs from the surveys included isobaths and bottom hardness contours. The data is presented as contour plots in FIGS. 6A and 6B.

To compare the ground truth survey points to the sonar depth data, both data sets were imported into ArcGIS pro. The sonar data was converted to the same coordinate system as the ground truth points, such that horizontal coordinates are in State Plane Florida West FIPS 0902 (meters) using the 2011 realization of NAD 1983 and vertical coordinates are in height above ellipsoid (meters), respectively. In addition, the sonar data must have the water level subtracted, which was measured at the start of the flight using the RTK GNSS level rod. Subtracting the water surface elevation accounts for the length of a range pole, or in this case, the level rod, when taking rover measurements with RTK GNSS.

Figure 6E:
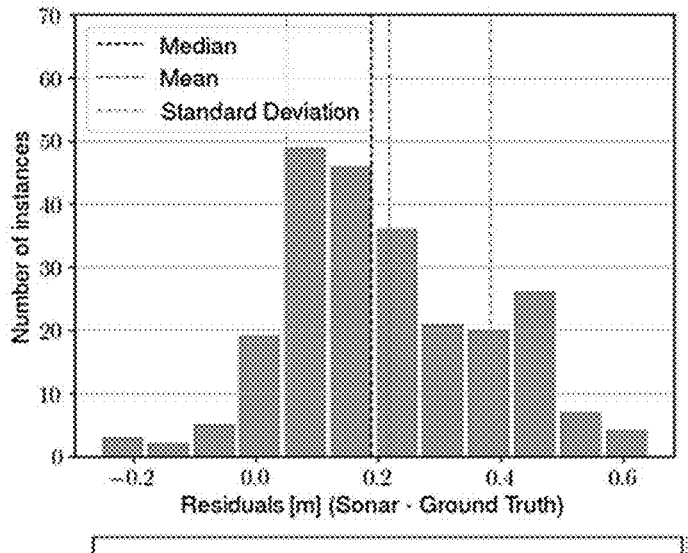
Figure 6F:
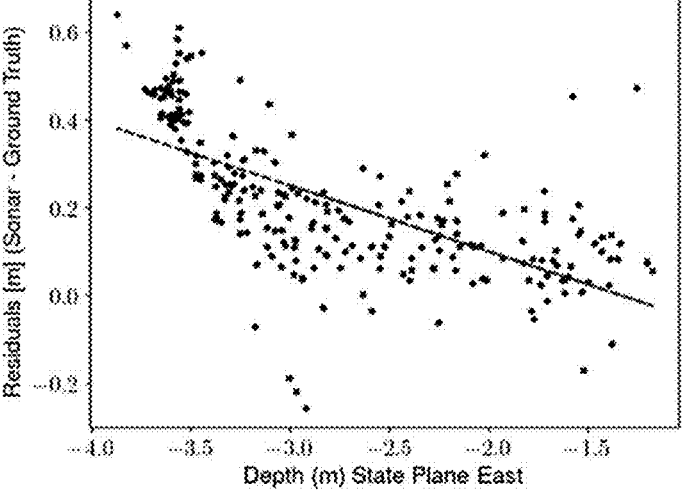

The ArcGIS Pro geostatistical wizard is a toolset that guides users through the process of making interpolation-based surfaces in a step-by-step manner. The geostatistical wizard uses point data to create an interpretive raster surface. To use this tool, the sonar data was imported into ArcGIS from Reefmaster as a point shapefile, with each point representing an individual sonar depth observation. The geostatistical wizard uses the point sonar data with a selected area interpolation method. Local polynomial interpolation was used to create the surface, and the extents were clipped in the processing environments tab (FIG. 6A). The surface interpolation was restricted to the limits of the sonar data capture to minimize extrapolation. The GA layer to points tool was then used to compare the acquired ground truth survey points to the interpolated sonar data. The GA layer to points tool can be used to measure the accuracy of a predicted surface by comparing it to known point observations. In this case, accuracy can be assessed by comparing the predicted surface output from the sonar to the points measured using the RTK GNSS level rod. FIG. 6D shows the residuals (m) between local polynomial interpolation of combined flight transects and ground truth data. Positive residuals indicate sonar readings are deeper than ground truth. FIG. 6E shows histogram and summary statistics of residuals where the mean is 21.6 cm, the median is 18.7 cm, and the standard deviation is 16.7 cm. FIG. 6F shows scatterplot of residuals and the relationship with depth.

The detailed measure of accuracy indirectly captures the horizontal accuracy of the sonar data within the depth measurements. To isolate horizontal accuracy from vertical accuracy, the quoted accuracy of the GNSS devices used can be considered. The Trimble RTK GNSS equipment is positionally accurate with a horizontal accuracy of 1-2 cm, while Pixhawk Cube Orange GNSS RTK internal to the vessel can be as accurate as 3 cm and the Lowrance Elite Ti2 claims 20 m R.M.S. positioning accuracy. A simple preliminary experiment comparing the three devices observed that the Lowrance GPS can waiver from the RTK GNSS devices by 1.5-3 m. However, the uncorrected GPS is in principle mostly translated horizontally and still captures the relative path taken by the vessel.

Figure 7A:
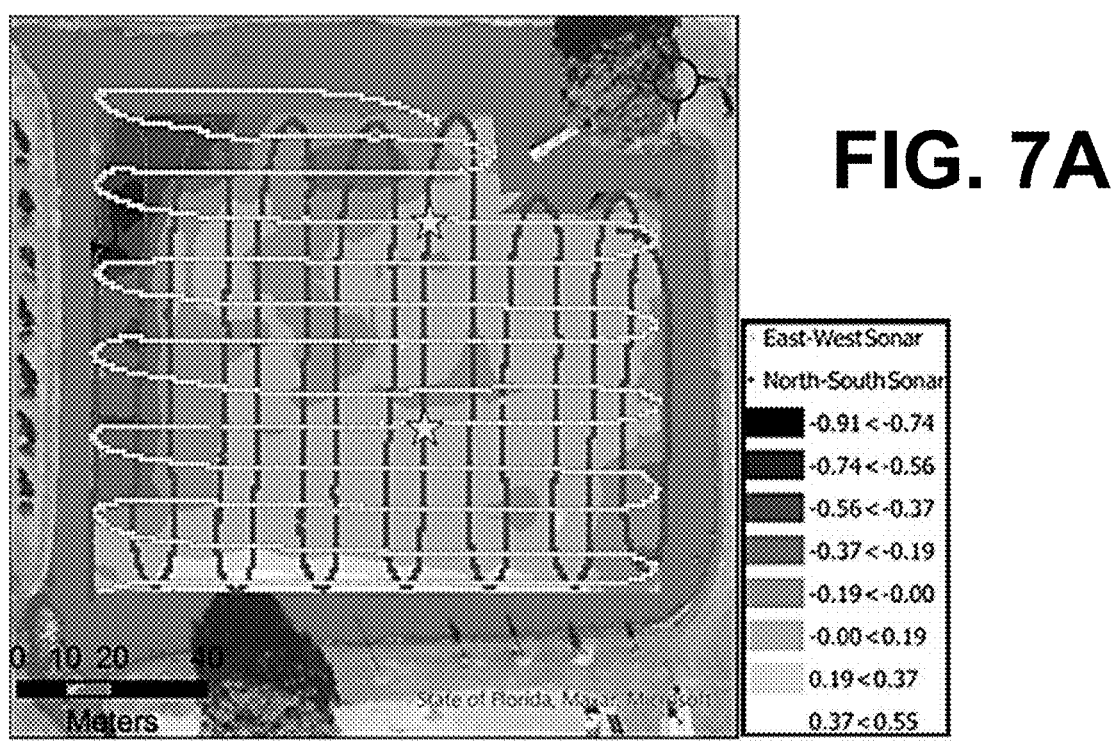

To compare one unique flight to another, raster surfaces were created. The ArcGIS Pro GA layer to raster tool was used to create raster surfaces from each of the obtained datasets. The individual raster was compared using the raster calculator, which is used to subtract the two from each other. By subtracting the two rasters, the distribution of the difference between the two surfaces becomes apparent. FIG. 7A is a visualization of East-West Interpolated surface versus that of North-South transects. The mean residual is −2.64 cm, the median is 0.95 cm, and the standard deviation is 16.98 cm. The stars labeled "intersection" are example calculation locations for the depth difference between NS and EW.

Figure 7D:
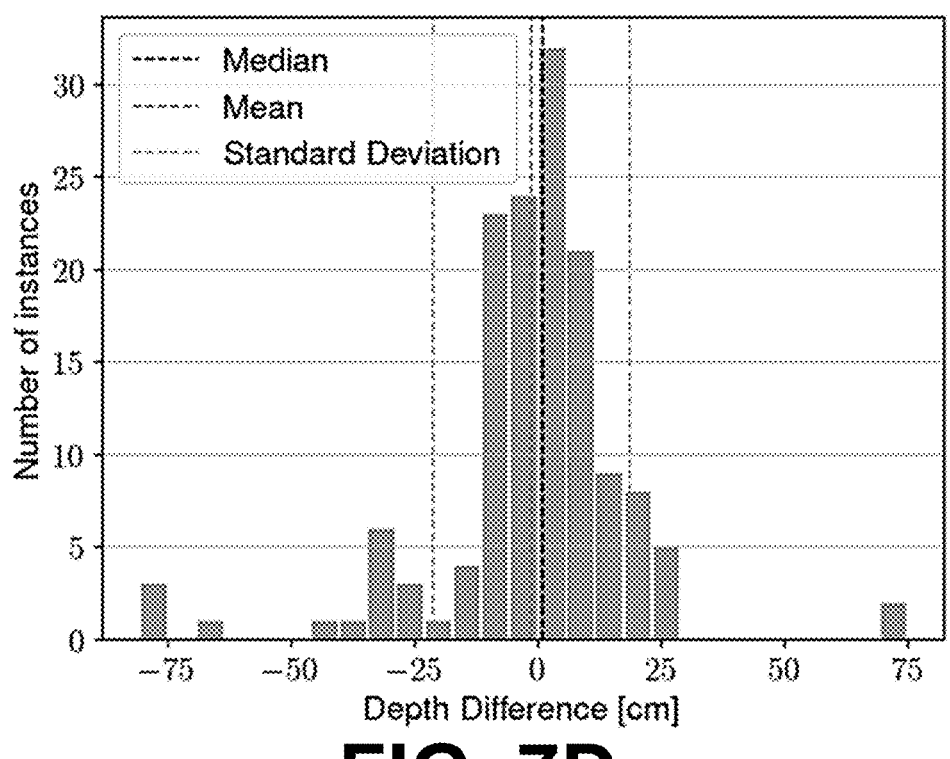
Figure 7B:
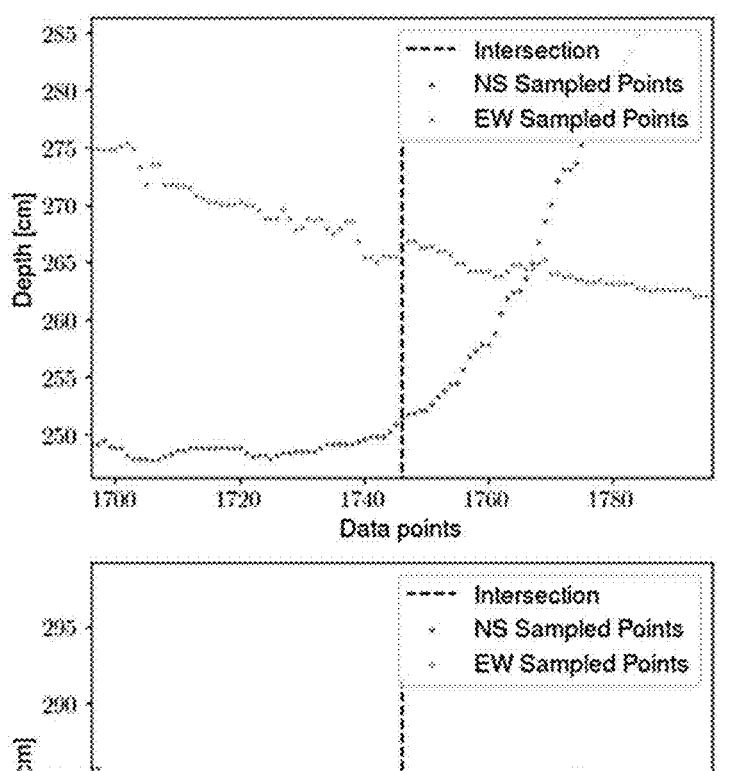
Figure 7C:
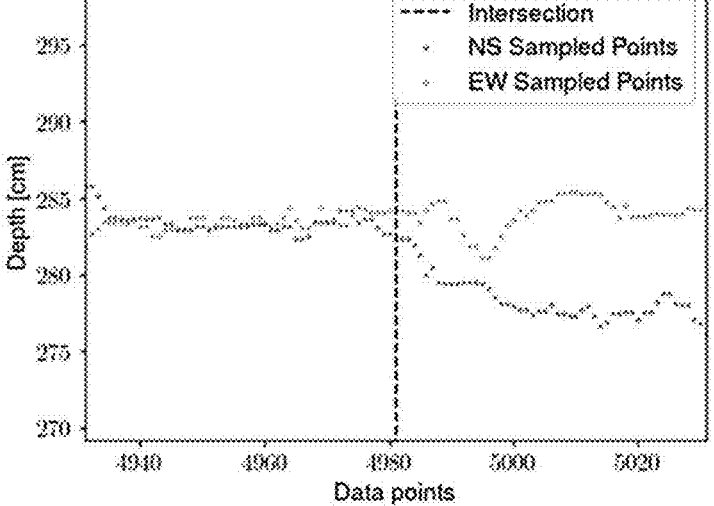

The second approach to analyze the precision of the system depth measurements compares the values at each intersection of the North-South (NS) and East-West (EW) raster paths, as illustrated in FIG. 7A. The difference in the two depth values from NS and EW paths was computed using the black intersection line shown in FIGS. 7B and 7C. Depth values of the data values shown in FIG. 7A on the upper star and lower star of FIGS. 7B and 7C, respectively. The point where the two intersect is shown by the vertical line. The difference for the plot of FIG. 7B is 14.9 cm and the difference for the plot of FIG. 7C is −1.69 cm. The intersecting points were found by dividing the raster pattern into straight-line segments, excluding the curved part of the trajectories, and then running an algorithm that iterates for all the NS and the EW paths to find the samples with the minimum distance between each other (ideally zero for exact intersections). The 10 closest points from the intersection points were used to fit a 10th-order polynomial of the depth values, and the precision is calculated as the difference in the polynomial depth values at the intersection points. A total of 144 intersecting points were used for this precision analysis. The result of the difference of depth measurements at the intersections is summarized as a histogram in FIG. 7D, where the mean and median value of all the precision calculations is-1.37 cm and 0.89 cm respectively, and the standard deviation is 19.9 cm.

System analysis of depth reflects horizontal and vertical errors. These errors can be characterized statistically from the ground truth data and measured in multiple approaches for accuracy and precision. The accuracy measures point towards potential improvement if IMU and RTK data is used to correct the depth values. This conclusion is drawn from the sonar consistently reading deeper than the ground truth data on average by 21.6 cm, and most of the error focused on the deeper area, as highlighted by the scatter-plot FIG. 6F. The deeper this system is deployed without correction, the more pronounced small angle changes in attitude will impact accuracy. The major limiting factor of improving accuracy, to be addressed by incorporating IMU and RTK corrections, is also supported by the relative precision between independent surveys.

Figure 8:
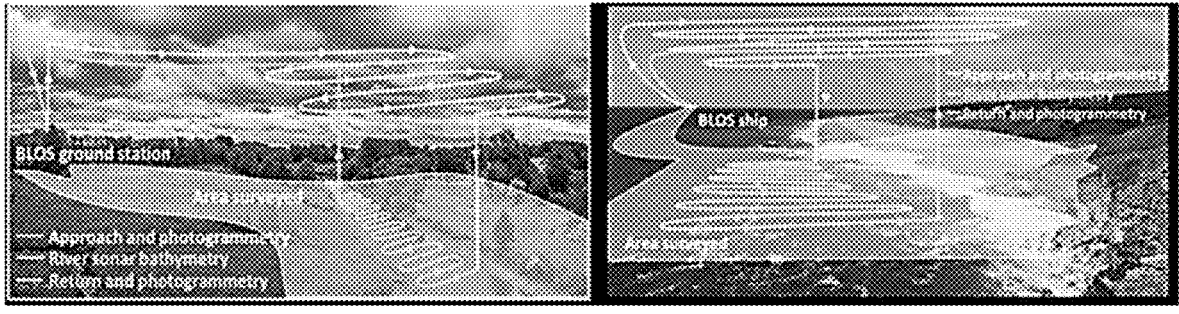
FIG. 8 illustrates examples of flight paths of the bathy-drone system from a remote ground station, approach, aerial survey, bottom scan, return to the ground station. Examples are shown for a river crossing and ship-to-shore landing survey, in accordance with various embodiments of the present disclosure.

Ensuring proper placement of the vessel in the water at the first waypoint needs pilot skill and familiarity with the system. The Bathy-drone at its current stage has successfully demonstrated rapid deployment in difficult-to-access waters to gather bathymetry, backscatter, and sonar imagery affordably. The Bathy-drone represents a cost effective, efficient, and accurate solution for rapid survey and inspection of maintained waterways, canals, shipping channels, rivers, and retention ponds. Additionally, it can be used for rapid inspection for river/gap crossing and ship-to-shore maneuvers by first performing a high-altitude aerial survey, then utilizing that data for in-situ path planning for the bathymetric portion of the survey. This can ensure that the vessel path avoids obstructions on the water surface such as rocks, and trees. The entire survey (both above and below the waterline) can be initiated beyond-line-of-sight, miles away from the river crossing or shore locations. In addition to the photogrammetric and bathymetric surveys the vessel could measure wave height/period, water current and identify underwater hazards that complicate subsequent missions. FIG. 8 shows a potential CONOPs for a gap crossing and ship-to-shore surveys, illustrating flight paths of the Bathy-drone system from the beyond-line-of-sight ground station, approach, aerial survey, bottom scan, return to the ground station, for a river crossing and ship-to-shore pre-mission survey. Both scenarios can be accomplished by a single remote operator and no river access/boat ramps are needed.

The multirotor towable bathymetric system presented in this disclosure results from the multiple cycles of the iterative design process. The bathymetric system can be used in open areas to avoid obstacles that can interfere with the safe operation of the multi-rotor UAS. Obstacles such as bridges, pilings, and trees are commonly near bodies of water. To avoid these hazards, active vessel control with, e.g., a servo-actuated rudder can allow for autonomous control semi-independent of the multirotor UAS. Active control of the vessel can include active flight changes, an active winch mechanism, or both to maintain consistent tether tension. The UAS can monitor the vessel to facilitate control during operations. An emergency break-away tether connection can be included to reduce the chance of losing the UAS into the water if the vessel is snagged.

A new hull design based upon field testing finished the composite layup manufacturing process. The new design can reduce capsizing during aggressive turns and the initial placement on the water, thereby reducing pilot fatigue and extending mission efficiency. Reduced capsizing can be achieved with a rounded hull deck and low center of gravity like self-righting manned vessels. A larger hatch allowing for easier access to internal payload can also be configured for structural integrity and environmental intrusion. The stabilizing fins and rudder can be reduced in depth to increase operational capability in shallow areas further and avoid groundings, flotsam, and floating vegetation.

Measuring the area's water level so that the data can be tied to a coordinate reference system can be simplified with an onboard RTK GNSS receiver. The bathymetric system can comprise both the RTK GNSS receiver and the IMU installed for experimentation, but ultimately the position and attitude data would be processed onboard to correct the sonar and broadcast the result live to the ground station.

The SBES sonar sensor can be upgraded to improve the swath coverage and reduce interpolation between transects. Additionally, underwater geometric features can be submerged in the pond to assess the resolution of locating and identifying structures of interest.

The sonar imagery generated from side-scan and down-scan can be used for qualitative assessment and cursory characterization of the marine ecology and environment, obstacles, and infrastructure (FIG. 6C). Ground truthing the bottom hardness measures can provide more confidence in quantifying the backscatter data. Generating point clouds for three-dimensional reconstruction of the sonar data can also assist in bottom visualization. The sonar imagery can also be used for object identification and avoidance or to inform further exploration of areas of interest (AOI). Integrating communication between the drone and the vessel can allow the vessel to command the drone to explore a new AOI.

The unmanned Bathy-drone is a novel configuration for rapid bathymetry and bottom characterization. The tethered vessel can be towed autonomously on a preprogrammed mission by a multirotor drone. The surface vessel can comprise a fixed recreational COTS sonar with down-scan, side-scan, and chirp capabilities gathering sonar imagery, bathymetry, and bottom hardness data. The raw field data can be stored on board using a microSD card and transmitted live via telemetry link. Field operation of the Bathy-drone system highlighted novel advantages unique to the tethered configuration. Bathymetric surveys that have been conducted using the Bathy-drone system include:

a 5-acre retention pond as previously discussed;

a turbid shallow water environment with depths across muddy flats vary between 1-4 ft across a 5-acre area;

a river waterway having depths varying between 6-35 ft along the over an area of 9-acres;

a 130 ft wide canal across a 5-acre area; and a 42 ft deep quarry.

Surveys can be based on land as the multirotor airlifts the vessel to the first waypoint on water allowing for rapid deployment and reduced crew fatigue. Boat docks are unnecessary as the Bathy-drone can fly over obstacles such as mud flats, sandbars, tree lines and fences. Transport of the system and ground station to the area of interest via manned boat or vehicle is convenient due to the low weight and volume. The propulsion is provided by the multirotor drone allowing the vessel to glide over swift current, debris, floating vegetation, and the ground. Speeds of 0-24 km/h (0-15 mph) were tested and more than 40,000 m² (10 acres) was surveyed with one battery charge in less than 25 minutes. Field testing will continue to inform new applications and iterations.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A Bathy-drone system, comprising:

an unmanned payload vessel comprising a sensor or sensor suite coupled to a bottom of the payload vessel and a tether attachment point through which propulsive force is applied to the payload vessel, the payload vessel comprising a trim plate extending from a stern of the payload vessel; and an unmanned drone tethered to the payload vessel through the tether attachment point, the unmanned drone capable of autonomously transporting the payload vessel to and from a survey location and autonomously propelling the payload vessel along a survey path at the survey location, where the trim plate is angled downward aft of the stern thereby providing a speed-dependent pitching moment that maintains the payload vessel level as it is propelled by the unmanned drone.

2. The Bathy-drone system of claim 1, wherein a force exerted on the payload vessel by the unmanned drone through the tether attachment point passes through a center of gravity of the payload vessel.

3. The Bathy-drone system of claim 1, wherein the payload vessel is unmanned aircraft system (UAS) agnostic allowing any unmanned drone to tow the payload vessel without prior modification.

4. The Bathy-drone system of claim 1, wherein the payload vessel has a weight, and the unmanned drone can carry the weight of the payload vessel.

5. The Bathy-drone system of claim 1, wherein the trim plate is configured to maintain the payload vessel level in a speed range from zero to about 24 km/h.

6. The Bathy-drone system of claim 5, wherein the trim plate is weighted to maintain the payload vessel level at standstill.

7. The Bathy-drone system of claim 1, wherein the trim plate comprises fins extending below the trim plate.

8. The Bathy-drone system of claim 7, wherein the payload vessel pivots about the fins.

9. The Bathy-drone system of claim 1, wherein the trim plate acts as an electrical ground for the sensor or sensor suite.

10. The Bathy-drone system of claim 1, wherein the payload vessel comprises a skiff-like hull design.

11. The Bathy-drone system of claim 10, comprising an autopilot configured to independently steer the payload vessel by a rudder.

12. The Bathy-drone system of claim 1, wherein the payload vessel is configured to transmit data collected by the sensor or sensor suite via an on-board telemetry link.

13. The Bathy-drone of claim 12, wherein the collected data comprises one or more of water temperature, turbidity, salinity, dissolved oxygen, nitrogen, depth, position, heading, or imagery.

14. The Bathy-drone system of claim 12, wherein the payload vessel is configured to communicatively couple to the unmanned drone, and the collected data is transmitted to a base station via the telemetry link.

15. The Bathy-drone system of claim 1, wherein the sensor or sensor suite is affixed to the bottom of the payload vessel.

16. The Bathy-drone system of claim 1, wherein the sensor or sensor suite comprises a sonar transducer.

* * * * *